United States Patent
Ionescu et al.

(10) Patent No.: US 11,034,393 B1
(45) Date of Patent: Jun. 15, 2021

(54) COLLAPSIBLE STORAGE CONTAINER FOR A CARGO BAY OF A VEHICLE

(71) Applicant: GM GLOBAL TECHNOLOGY OPERATIONS LLC, Detroit, MI (US)

(72) Inventors: Alexandru F. Ionescu, Warren, MI (US); Joseph M. Polewarczyk, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/903,490

(22) Filed: Jun. 17, 2020

(51) Int. Cl.
*B62D 33/027* (2006.01)
*B60R 9/06* (2006.01)
*B62D 33/04* (2006.01)

(52) U.S. Cl.
CPC .............. *B62D 33/027* (2013.01); *B60R 9/06* (2013.01); *B62D 33/04* (2013.01)

(58) Field of Classification Search
CPC .......... B62D 33/027; B62D 33/04; B60R 9/06
USPC ................... 296/37.6, 50, 57.1, 51
See application file for complete search history.

(56) References Cited

U.S. PATENT DOCUMENTS

| 4,749,226 A | * | 6/1988 | Heft | B62D 33/0273 |
| | | | | 296/37.6 |
| 5,853,116 A | * | 12/1998 | Schreiner | B60R 9/00 |
| | | | | 224/404 |
| 9,387,806 B2 | | 7/2016 | Bzoza | |
| 9,387,812 B2 | * | 7/2016 | Bexar | B62D 33/023 |
| 9,481,316 B2 | * | 11/2016 | Faruque | B62D 33/027 |
| 2005/0242138 A1 | * | 11/2005 | Warganich | B60R 7/02 |
| | | | | 224/404 |
| 2009/0250962 A1 | * | 10/2009 | Polewarczyk | B60P 7/14 |
| | | | | 296/57.1 |
| 2014/0326764 A1 | * | 11/2014 | Roach | B60P 7/0892 |
| | | | | 224/404 |

FOREIGN PATENT DOCUMENTS

CA       2700005 A1    10/2011

\* cited by examiner

*Primary Examiner* — D Glenn Dayoan
*Assistant Examiner* — E Turner Hicks

(57) ABSTRACT

A vehicle includes a cargo bay defined by a fore endwall, a first sidewall, a second sidewall, and a bed. A closure panel is pivotable between an open position and a closed position with respect to the cargo bay. The vehicle also includes a collapsible storage container comprising a plurality of wall panels. Each respective wall panel of the plurality of wall panels is pivotably coupled to at least one other respective wall panel of the plurality of wall panels. The plurality of wall panels are selectively repositionable between a stowed position and a deployed position. A respective wall panel of the plurality of wall panels is pivotably coupled to the interior side of the closure panel. In the stowed position each respective wall panel is disposed parallel to the closure panel and in the deployed position a storage volume is defined between the plurality of wall panels.

7 Claims, 3 Drawing Sheets

COLLAPSIBLE STORAGE CONTAINER FOR A CARGO BAY OF A VEHICLE

INTRODUCTION

Pick-ups and utility vehicles are often provided with a bed or cargo bay for transporting cargo. A variety of accessories are available for utilizing the cargo space. For example, bed dividers and other storage accessories can be purchased as an after-market item. When not in use, these items must generally be removed from the vehicle and stored off-board. Storing multiple such accessories may occupy a significant amount of space.

SUMMARY

A vehicle according to the present disclosure includes a cargo bay defined by a fore endwall, a first sidewall, a second sidewall, and a bed. The vehicle additionally includes a closure panel pivotably coupled to the cargo bay. The closure panel is pivotable between an open position and a closed position with respect to the cargo bay. The closure panel is a generally planar body having an interior side proximate the cargo bay. The planar body is parallel to the bed in the open position and orthogonal to the bed in the closed position. The vehicle also includes a collapsible storage container comprising a plurality of wall panels. Each respective wall panel of the plurality of wall panels is pivotably coupled to at least one other respective wall panel of the plurality of wall panel. The plurality of wall panels are selectively repositionable between a stowed position and a deployed position. A respective wall panel of the plurality of wall panels is pivotably coupled to the interior side of the closure panel. In the stowed position each respective wall panel is disposed parallel to the closure panel and in the deployed position a storage volume is defined between the plurality of wall panels.

In an exemplary embodiment, the closure panel has a lower end proximate the cargo bay and an upper end spaced from the cargo bay. The plurality of wall panels includes a first wall panel pivotably coupled to the lower end, a second wall panel pivotably coupled to the first wall panel, and a third wall panel pivotably coupled to the second wall panel. In such embodiments, with the closure panel in the closed position and the storage container in the deployed position the second wall panel may be parallel to the closure panel, and the first wall panel may be parallel to the third wall panel and the bed. Such embodiments may include a locking member selectively securing the third wall panel to the upper end of the closure panel.

In an exemplary embodiment, in the deployed position the first sidewall and second sidewall of the cargo bay define first and second sidewalls of the storage container.

In an exemplary embodiment, the vehicle additionally includes a power coupling disposed on a respective panel of the plurality of panels, the power coupling being configured to supply electric power to an object disposed in the storage container.

A collapsible storage container for a vehicle according to the present disclosure includes a first panel, a second panel, and a third panel. The first panel extends from a first panel proximal end to a first panel distal end. The first panel proximal end is pivotably coupled to an interior face of an endgate of an automotive vehicle cargo bay. The second panel extends from a second panel proximal end to a second panel distal end. The second panel proximal end is pivotably coupled to the first panel distal end. The third panel extends from a third panel proximal end to a third panel distal end. The third panel proximal end is pivotably coupled to the second panel distal end. The container additionally includes a restraint member configured to selectively couple the third panel distal end to the endgate.

In an exemplary embodiment, the container additionally includes a first hinge, a second hinge, and a third hinge. The first panel proximal end is pivotably coupled to an interior face of an endgate of the automotive vehicle cargo bay via the first hinge. The second panel proximal end is pivotably coupled to the first panel distal end via the second hinge. The third panel proximal end is pivotably coupled to the second panel distal end via the third hinge.

Embodiments according to the present disclosure provide a number of advantages. For example, the present disclosure provides an integrated storage solution for a vehicle which is capable of storing objects in a variety of configurations.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
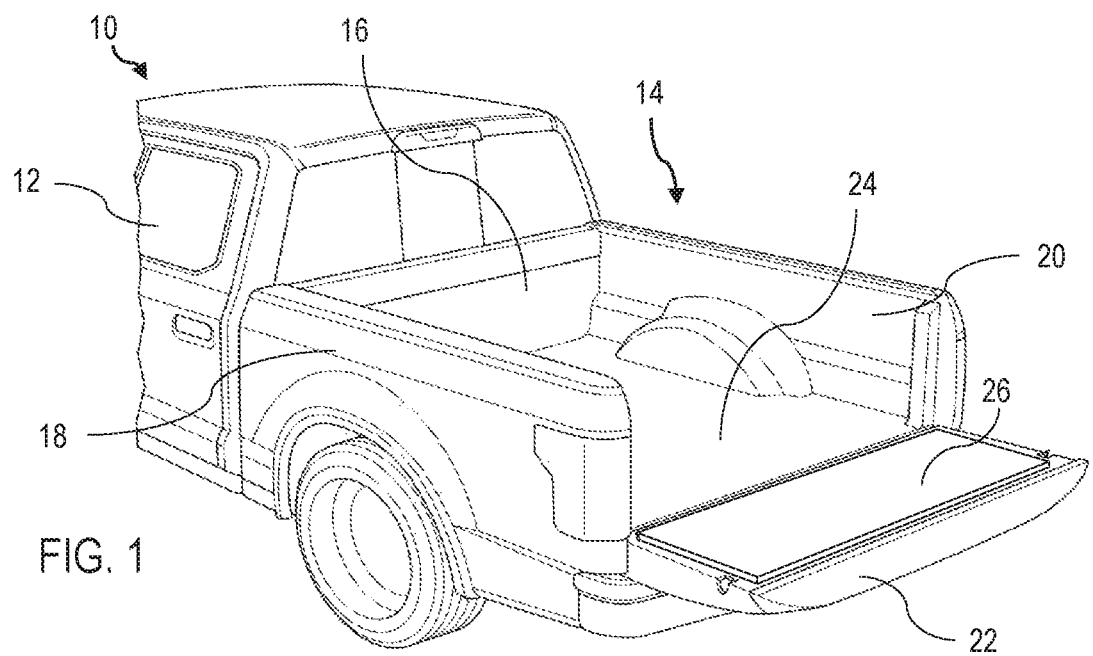
FIG. 1 is an illustration of a vehicle according to an embodiment of the present disclosure.

Referring now to FIG. 1, a vehicle 10 is illustrated. The vehicle 10 is provided with a cabin 12 for transporting occupants and with a cargo bay 14, which may alternatively be referred to as a bed or tonneau, for transporting cargo.

The cargo bay 14 is bounded by a left sidewall 18, a right sidewall 20, a fore endwall 16, an aft endwall 22, and a floor or bed 24. In this exemplary embodiment the fore endwall 26 is defined by an aft portion of the cabin 12 and the aft endwall 22 is pivotably coupled to the vehicle 10 to define a pivotable endgate 22. The left and right sidewalls 18, 20 extend generally longitudinally, i.e. generally parallel to a fore-aft axis of the vehicle 10. The fore endwall 16 and endgate 22 extend generally laterally, i.e. generally parallel to a side-side axis of the vehicle 10. The endgate 22 is pivotable between an open position, shown in FIG. 1, and a closed position, wherein the endgate 22 is disposed generally parallel to the fore endwall 16.

A collapsible storage container 26 is coupled to an interior face of the endgate 22, i.e a face of the endgate 22 proximate the cargo bay 14. In FIG. 1, the storage container 26 is shown in a stowed position. As will be discussed in further detail below, the storage container 26 comprises a plurality of panels coupled together by hinged connections. The plurality of panels may be arranged in various configurations to provide flexible storage.

In the illustrated embodiment, the storage container 26 extends the full width of the cargo bay 14, such that the left and right sidewalls 18, 20 define endwalls of the storage container 26 in the deployed position discussed below. In other embodiments, the storage container 26 may extend less than the full width of the cargo bay 14. In such embodiments, the plurality of panels of the storage container 26 may include endwall panels.

Figure 2:
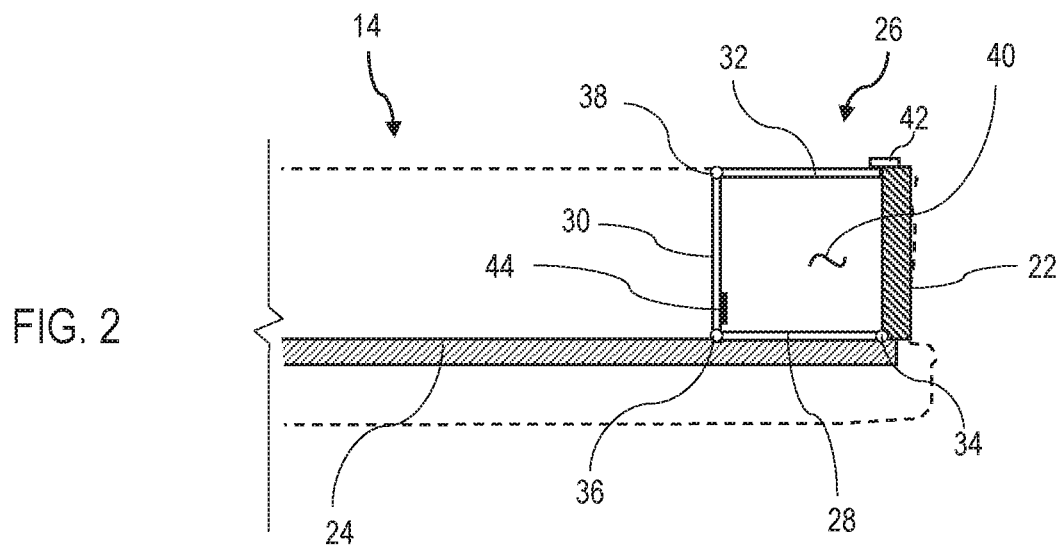
FIG. 2 is a first schematic cross-section view of a vehicle according to an embodiment of the present disclosure.

Referring now to FIG. 2, a cross-section view of the cargo bay 14 is shown schematically. As may be seen, the storage container 26 comprises a first panel 28, a second panel 30, and a third panel 32. The first panel 28 extends from a first end, which is pivotably coupled to a lower end of the endgate 22 proximate the bed 24 via a first hinged connection 34, to a second end, which is pivotably coupled to the second panel 30 via a second hinged connection 36. The second panel. The second panel 30 extends from a first end coupled to the second hinged connection 36 to a second end, which is pivotably coupled to the third panel 32 via a third hinged connection 38. The third panel 32 extends from a first end coupled to the third hinged connection 38 to a free end.

According to various embodiments, the first panel 28 may be directly coupled to the endgate 22, or may be pivotably coupled to an intermediate component which is, in turn, fixedly coupled to the endgate 22.

In an exemplary embodiment, the panels 28, 30, and 32 comprise a relatively rigid material. Such material may include a metallic material such as aluminum or steel, a polymeric material such as PC or ABS, or any other suitable material. The hinged connections 34, 36, 38 may comprise any suitable type of hinge, such as a piano hinge or a living hinge.

Various mechanisms may be used to secure the panels 28, 30, 32 in desired positions relative to one another and to the endgate 22. In an exemplary embodiment, retention members, e.g. retention pins, may be used to secure the respective panels 28, 30, 32 in a desired position relative to one another and to the endgate 22. In another exemplary embodiment, one or more of the hinged connections 34, 36, 38 may be provided with a clock spring 68. In such embodiments, the clock spring(s) may provide a counterbalance to facilitate motion of the panels 28, 30, 32 among the various positions.

In the configuration illustrated in FIG. 2, the storage container 26 is disposed in a deployed configuration. In this configuration, the panels 28, 30, 32 and the endgate 22 are arranged at right angles to one another to define a volume 40 therebetween. In this configuration, the third panel 32 defines a lid for the storage container 26. The third panel 32 is selectively secured in a closed position, e.g. as depicted in FIG. 2, by a restraint mechanism 42. According to various exemplary embodiments, the restraint mechanism 42 may include a clasp or other simple restraint, a keyed lock, a combination lock, an electronic lock, or any other suitable device for selectively securing the third panel 32 to the endgate 22.

Figure 3:
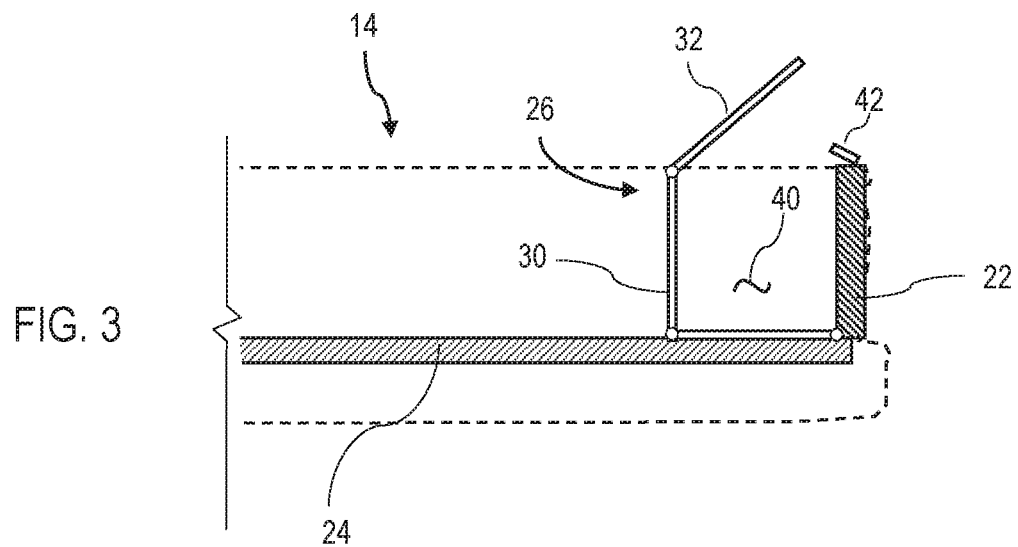
FIG. 3 is a second schematic cross-section view of a vehicle according to an embodiment of the present disclosure

As shown in FIG. 3, in the deployed configuration the restraint mechanism 42 may be released and the third panel 32 may be pivoted relative to the second panel 30, thereby enabling access to the volume 40 within the storage container 26. In an alternative embodiment, the third panel 32 may be maintained in the position illustrated in FIG. 2 while the endgate 22 may be pivoted to an open position, thereby enabling access to the volume 40 from aft of the vehicle 10.

Figure 4:
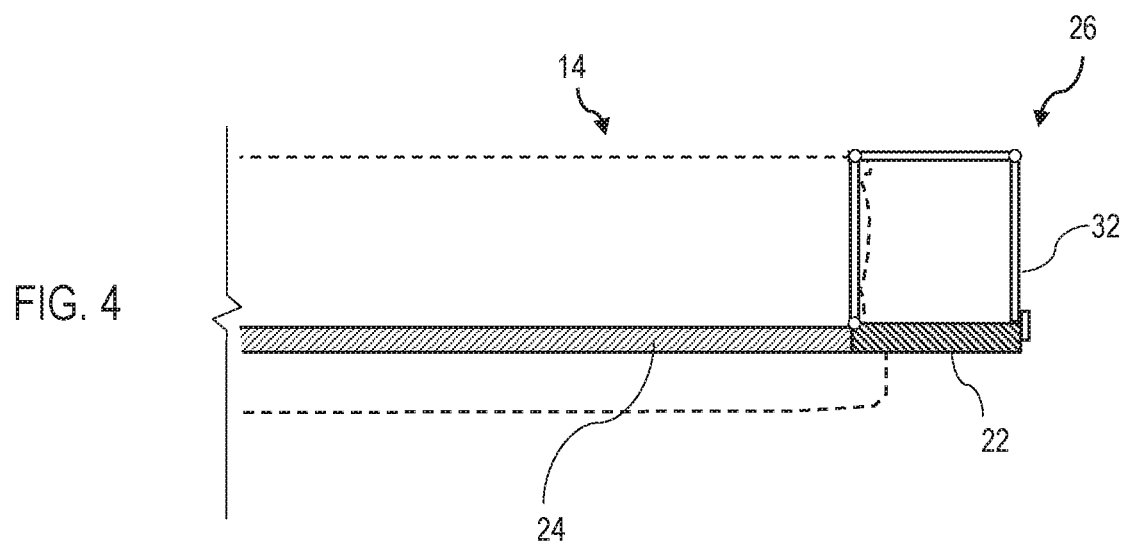
FIG. 4 is a third schematic cross-section view of a vehicle according to an embodiment of the present disclosure

As shown in FIG. 4, the endgate 22 may be pivoted to an open position while the storage container 26 is in the deployed position. Because the storage container 26 is coupled to the endgate 22, the storage container 26 pivots with the endgate. In this configuration, the third panel 32 is oriented generally vertically.

Figure 5:
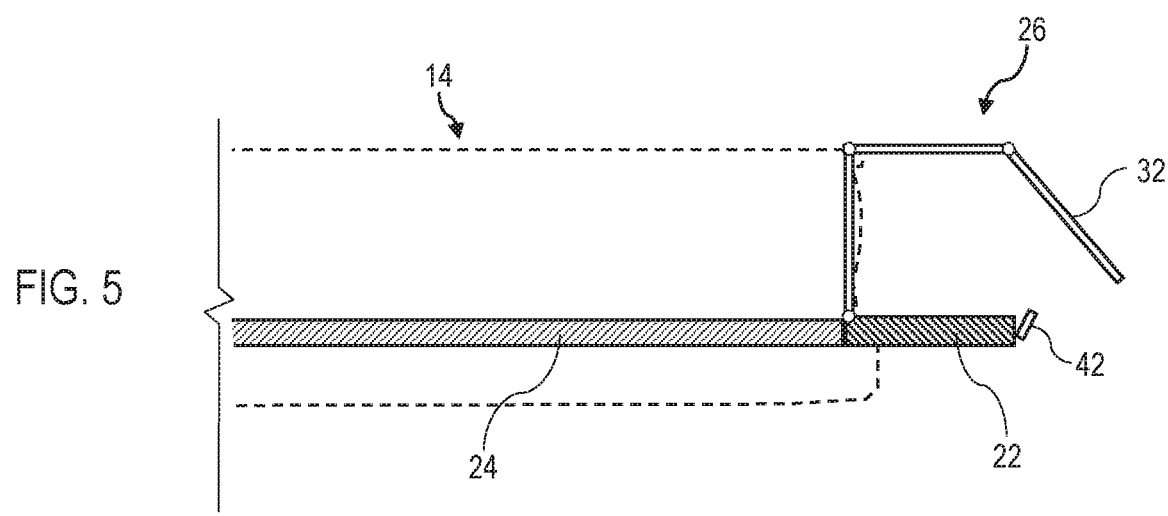
FIG. 5 is a fourth schematic cross-section view of a vehicle according to an embodiment of the present disclosure

As shown in FIG. 5, with the endgate 22 in the open position the restraint mechanism 42 may be released and the third panel 32 may be pivoted relative to the second panel 30, thereby enabling access to the volume 40 within the storage container 26. In this orientation, the storage container 26 may be accessed more easily from the exterior of the vehicle 10.

Figure 6:
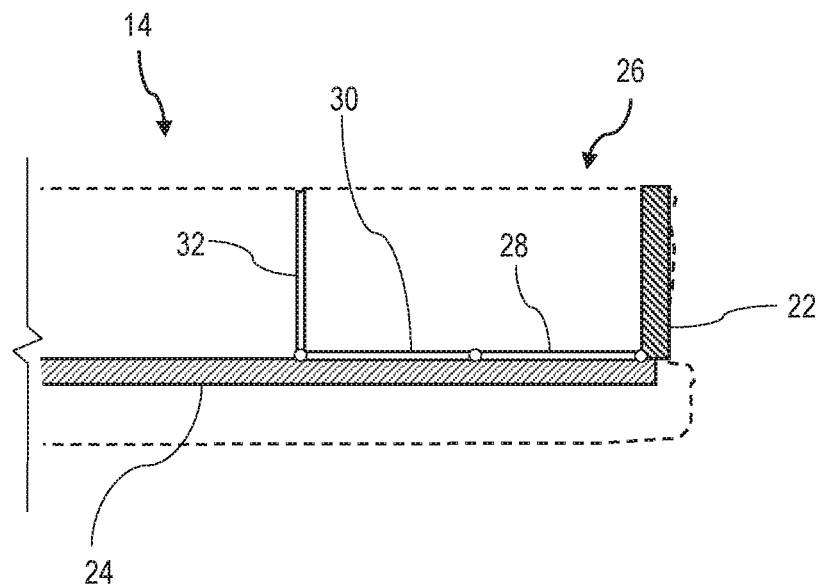
FIG. 6 is a fifth schematic cross-section view of a vehicle according to an embodiment of the present disclosure.
Figure 7:
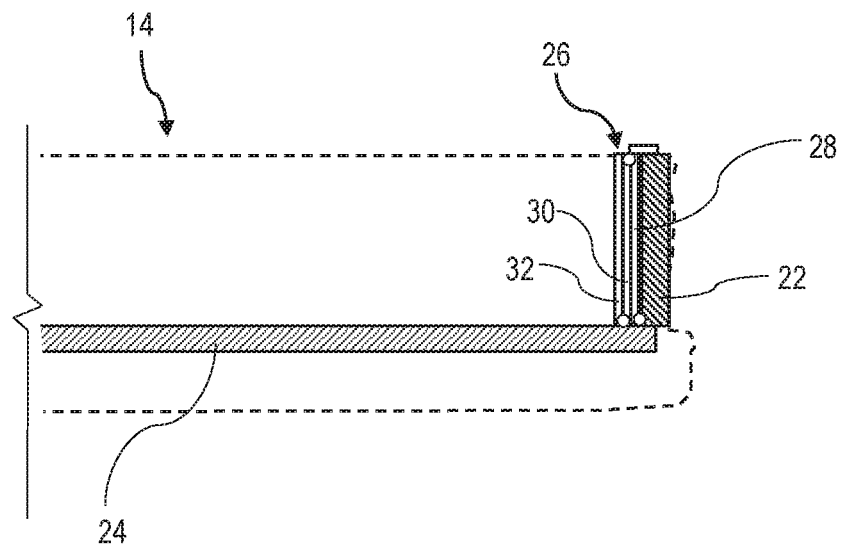
FIG. 7 is a sixth schematic cross-section view of a vehicle according to an embodiment of the present disclosure.

In the configuration illustrated in FIG. 6, the storage container 26 is disposed in an open-top configuration. In this configuration, the panels 28, 30, are disposed against the bed 24, and the third panel 32 and the second panel 30 are arranged at right angles to one another to define an open-top container. Optionally, a net may be secured between the upper end of the third panel 32 and the upper end of the endgate 22 to secure items placed therein.

In the configuration illustrated in FIG. 6, the storage container 26 is disposed in a stowed configuration. In this configuration, the panels 28, 30, 32 are disposed flat against one another and against the endgate 22. While one exemplary folding pattern is illustrated, as will be appreciated by one skilled in the art various other folding schemes may be used. In some embodiments, the endgate 22 may be provided with a recess within which the panels 28, 30, 32 may be disposed. In such embodiments, the third panel 32 may be flush with the interior face of the endgate 22.

Variations on the above are contemplated within the scope of the present disclosure. As a nonlimiting example, a sealing member may be disposed about the periphery of one or more of the panels 28, 30, 32 to provide the storage container 26 with water resistance in the deployed configuration. As another example, one or more of the panels 28, 30, 32 may be provided with a power coupling 44 in electrical communication with a battery of the vehicle 10, such that objects disposed within the storage container 26 may be provided with electrical power. Furthermore, while the vehicle 10 is depicted as a pickup truck, a storage container according to the present disclosure may be provided in other vehicle configurations as well.

As may be seen, the present disclosure provides an integrated storage solution for a vehicle which is capable of storing objects in a variety of configurations.

As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a cargo bay defined by a fore endwall, a first sidewall, a second sidewall, and a bed;
   a closure panel pivotably coupled to the cargo bay, the closure panel being pivotable between an open position and a closed position with respect to the cargo bay, the closure panel being a generally planar body having an interior side proximate the cargo bay, the planar body being parallel to the bed in the open position and orthogonal to the bed in the closed position;
   a collapsible storage container comprising a plurality of wall panels, each respective wall panel of the plurality of wall panels being pivotably coupled to at least one other respective wall panel of the plurality of wall panel, the plurality of wall panels being selectively repositionable between a stowed position and a deployed position, a respective wall panel of the plurality of wall panels being pivotably coupled to the interior side of the closure panel, wherein in the stowed position each respective wall panel is disposed parallel to the closure panel and wherein in the deployed position a storage volume is defined between the plurality of wall panels; and
   a power coupling disposed on a respective panel of the plurality of panels, the power coupling being configured to supply electric power to an object disposed in the storage container.

2. The vehicle of claim 1, wherein the closure panel has a lower end proximate the cargo bay and an upper end spaced from the cargo bay, and wherein the plurality of wall panels comprise a first wall panel pivotably coupled to the lower end, a second wall panel pivotably coupled to the first wall panel, and a third wall panel pivotably coupled to the second wall panel.

3. The vehicle of claim 2, wherein with the closure panel in the closed position and the storage container in the deployed position the second wall panel is parallel to the closure panel, and the first wall panel is parallel to the third wall panel and the bed.

4. The vehicle of claim 3, further comprising a locking member selectively securing the third wall panel to the upper end of the closure panel.

5. The vehicle of claim 1, wherein when in the deployed position the first sidewall and second sidewall of the cargo bay define first and second endwalls, respectively, of the storage container.

6. A collapsible storage container for a vehicle, comprising:
   a first panel extending from a first panel proximal end to a first panel distal end, the first panel proximal end being pivotably coupled to an interior face of an endgate of an automotive vehicle cargo bay;
   a second panel extending from a second panel proximal end to a second panel distal end, the second panel proximal end being pivotably coupled to the first panel distal end;
   a third panel extending from a third panel proximal end to a third panel distal end, the third panel proximal end being pivotably coupled to the second panel distal end;
   a restraint member configured to selectively couple the third panel distal end to the endgate, and
   a power coupling disposed on a respective panel of the first, second, and third panels, the power coupling being configured to supply electric power to an object disposed in the storage container.

7. The storage container of claim 6, further comprising a first hinge, a second hinge, and a third hinge, the first panel proximal end being pivotably coupled to an interior face of an endgate of the automotive vehicle cargo bay via the first hinge, the second panel proximal end being pivotably coupled to the first panel distal end via the second hinge, the third panel proximal end being pivotably coupled to the second panel distal end via the third hinge.

* * * * *